(12) United States Patent
Reid

(10) Patent No.: US 7,373,654 B1
(45) Date of Patent: May 13, 2008

(54) SYSTEM, APPARATUS AND METHOD FOR UPDATING SECURITY CONFIGURATIONS OF A PLURALITY OF SERVERS FROM A CENTRALIZED DIRECTORY SERVER

(75) Inventor: William J. Reid, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1548 days.

(21) Appl. No.: 09/620,350

(22) Filed: Jul. 20, 2000
(Under 37 CFR 1.47)

(51) Int. Cl.
*H04L 9/00* (2006.01)
(52) U.S. Cl. .............................. 726/1; 725/2; 713/155
(58) Field of Classification Search ................ 713/201, 713/155, 168; 705/51; 707/9, 1, 10, 201–205, 707/244; 709/219, 244; 717/168; 726/1, 726/2, 22, 26, 34
See application file for complete search history.

(56) References Cited

U.S. PATENT DOCUMENTS 5,151,989 A * 9/1992 Johnson et al. ............... 707/10
5,173,939 A * 12/1992 Abadi et al. .................... 707/9
5,335,346 A * 8/1994 Fabbio ......................... 711/163
5,701,458 A * 12/1997 Bsaibes et al. .................. 707/9
5,790,848 A * 8/1998 Wlaschin .................... 707/201
5,835,911 A * 11/1998 Nakagawa et al. ......... 707/203
5,956,715 A * 9/1999 Glasser et al. .................. 707/9

OTHER PUBLICATIONS

"Norton Antivirus: Norton Antivirus 5.0 for Windows NT servers", Symantec Corporation 1999, pp. 1-6.*
"Gannon University Norton Antivirus Configuration", vpa, Dec. 1999, pp. 1-12.*
WIndows NT server 4, Hadfield et al., 1997, pp. 197, 199.*

* cited by examiner

*Primary Examiner*—Jacques H. Louis-Jacques
*Assistant Examiner*—Thomas Ho
(74) *Attorney, Agent, or Firm*—Duke W. Yee; David A. Mims, Jr.; Gerald H. Glanzman

(57) ABSTRACT

A system, apparatus and method for updating security configurations of a plurality of servers from a centralized directory server. The system includes a centralized directory server and a plurality of servers that provide resources and store files for use by users of the system. Each file/resource associated with the servers includes a security parameter list identifying authorized users of the file/resource. The security parameter lists are updated from the centralized directory server by first inputting changes to the system security configuration in the directory server and then downloading these changes to the plurality of servers. The changes are used by the plurality of servers to update the security parameter lists associated with the files/resources of the server.

25 Claims, 5 Drawing Sheets

SYSTEM, APPARATUS AND METHOD FOR UPDATING SECURITY CONFIGURATIONS OF A PLURALITY OF SERVERS FROM A CENTRALIZED DIRECTORY SERVER

BACKGROUND OF THE INVENTION

1. Technical Field

The present invention is directed to a system, apparatus and method for updating security configurations of a plurality of servers from a centralized directory server.

2. Description of Related Art

As businesses and organizations grow in size, their computer networks also grow to accommodate the increasing workload. It is not unusual for large businesses and organizations to have hundreds or thousands of network servers located in many different geographical locations. As the computer networks increase in size, security issues become more of a problem.

For example, many computer networks make use of Windows NT Servers, available from Microsoft Corporation, which provide resources and store files for use by users of the computer network. The resources and files of the Windows NT Servers have access control lists (ACLs) associated with them. An ACL is a set of data associated with a file, directory or other resource that defines the permissions that users and/or groups have for accessing it.

As the computer network grows in size, the number of servers and resources/files on the computer network increase. A user may be granted access to resources/files on a large number of the servers of the computer network. If a user's access to the computer network is changed, each server of the computer network must be updated to reflect the user's new access. Such updates require that the ACL of each file on each server of the computer network to which the user had access and the ACL of each file on each server to which the user will be granted access, be updated.

The current manner in which this access update is accomplished is to have a human network administrator log onto each server individually and update the ACLs to reflect the user's new access. When the computer network has grown to a large size, such updates become impractical. As a result, many businesses and organizations do not make use of the ACLs or do not update them to reflect changes in user access. As a result a serious security problem arises. Thus, it would be advantageous to have a system, apparatus and method for updating security configurations of a plurality of servers from a centralized location.

SUMMARY OF THE INVENTION

The present invention provides a system, apparatus and method for updating the security configurations of servers from a centralized directory server. With the present invention, when a change needs to be made to the authorized users of the servers, the change is first registered with a centralized directory server. The changed attribute(s) is then downloaded to the servers and used to update security parameter lists associated with each file to which the user's access has changed. By downloading the changed attribute, either only the user's information whose attribute has changed will be downloaded or the entire directory listing may be downloaded to each server for use in updating the security parameter lists.

The downloading of the changed attribute may be initiated by a system administrator, may be a periodically initiated event, or by some selected event. Alternatively, each server may log onto the directory server and request information to be downloaded from the directory server. Such log on requests from the servers may be for the entire directory listing or may be for designated subsections of the directory listing.

The downloaded information from the directory server is used by the servers to update the security parameter lists for the files and resources of the servers. The information downloaded from the directory server may be filtered to obtain only the information used to update the security parameter lists. The filtering may be performed by application programs running on either the servers or on the directory server.

In this way, the security parameter lists on each server may be updated without requiring a user or network administrator to log onto each server individually to make the change to each file/resource. Rather, with the present invention, the security parameter lists may be updated from a centralized directory database in a relatively automatic fashion, thereby greatly reducing the burden of maintaining secured network servers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
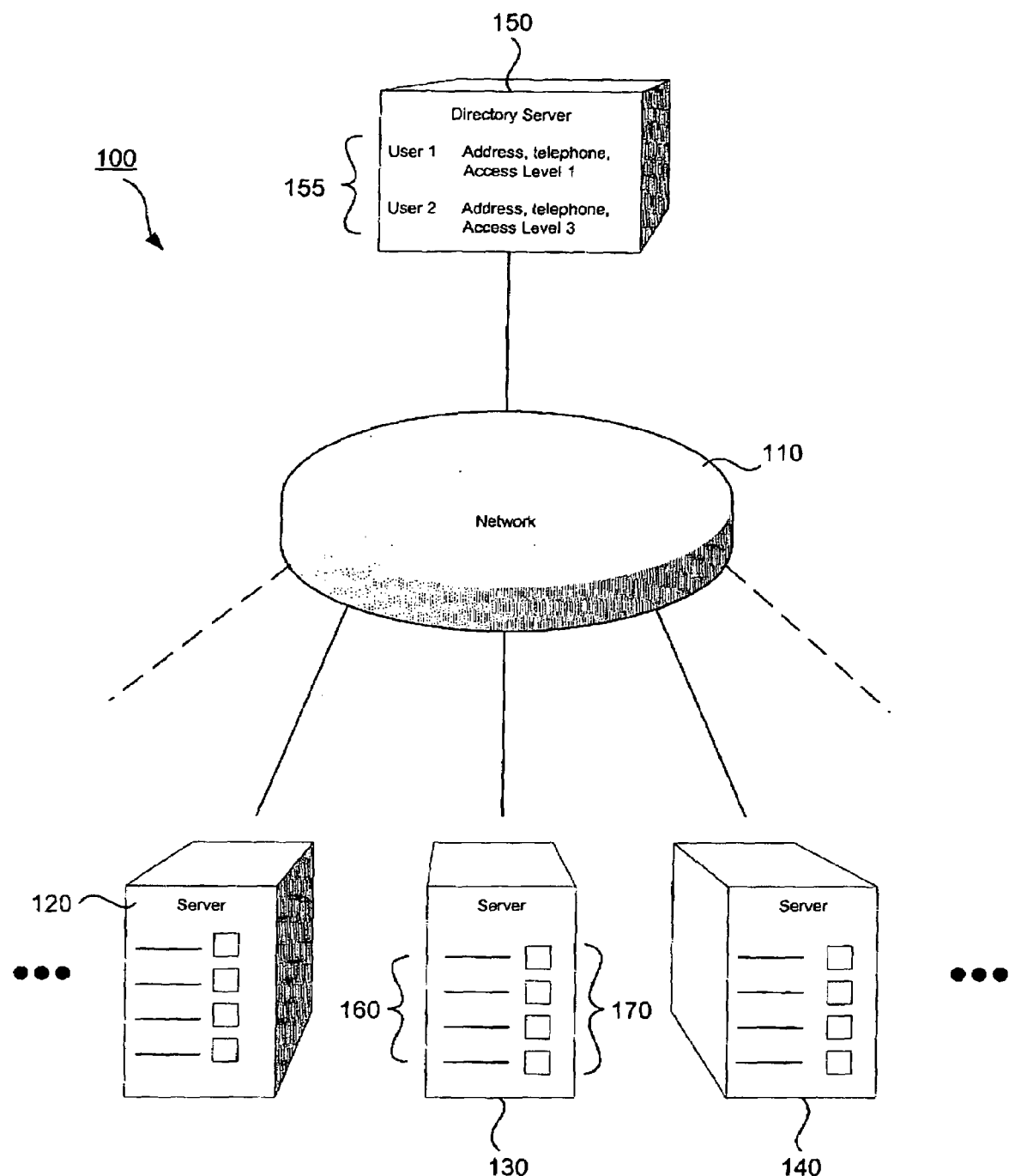
FIG. 1 is an exemplary block diagram of a system in which the present invention may be implemented.

FIG. 1 is an exemplary block diagram of a system 100 in which the present invention may be implemented. As shown in FIG. 1, the system 100 includes a network 110, a plurality of servers 120-140, and a directory server 150. Each server 120-140 stores files 160 and provides resources that are accessible by users of the network 110.

Each file and/or resource of each server 120-140 has an associated security parameter list 170, such as an access control list (ACL). The security parameter list 170 identifies which users or groups of users are to be provided access to the associated file. For example, the security parameter list 170 may include a listing of user identifiers of authorized users.

The designation of which users or groups of users are given access to a particular file may be made, for example, by a particular user's system identifier, a user's name, a user's group identifier, a user's access security level, and the like. For example, the security parameter list 170 may indicate that all users of access security level 3 or higher may access a particular file. Alternatively, the security parameter list 170 may indicate that John Smith has access to the particular file or that all users in the "Sales" group are given access to the file. Any manner of designating authorized users is intended to be within the spirit and scope of the present invention.

The directory server 150 stores a directory listing 155 of users of the network 110. The directory listing 155 may be a flat file, a relational database, or the like. The directory listing 155 includes, for example, a user identifier and various user attributes. The user attributes may include, for example, the user's name, address, contact information, groups to which the user belongs, such as "Sales" or "Research and Development", an access security level, and the like. The directory listing 155 may include more attributes than is used by the security parameter lists 170.

The servers 120-140 and the directory server 150 communicate with each other over the network 110. The network 110 may be any type of network for communicating data between data processing devices. For example, the network may be a local area network (LAN), a wide area network (WAN), the Internet, an intranet, wireless communication network, satellite communication network, and the like. Furthermore, the network 110 may be a plurality of networks of the same or different types.

The servers 120-140 and the directory server 150 may communicate with one another using any known or later developed protocol, as is readily apparent to those of ordinary skill in the art. For example, the servers 120-140 and the directory server 150 may communicate over the network 110 using the telnet protocol, light weight directory access protocol (LDAP), transfer control protocol (TCP)/Internet Protocol (IP), and the like.

When a change needs to be made to the authorized users of the network 110 and/or the servers 120-140, the change is first registered with the directory server 150. For example, if a user of the network 110 is transferred from a first group, e.g. "R&D", to a second group "Sales", the files to which the user is provided access may need to be changed so that the user is provided access to files he/she did not have access to and the user's access is removed from files that he/she should no longer have access to.

The change is first made to the directory listing 155 in the directory server 150. The update to the directory listing in the directory server 150 may be made, for example, by logging onto the directory server 150 and using an editor or other server application to edit the directory listing 155. For example, an editor may be used to search the directory listing for a particular user identifier and then to edit the attributes associated with the user identifier.

The changed attribute is then downloaded to the servers 120-140 and used to update the security parameter lists 170 associated with each file to which the user's access has changed. By downloading the changed attribute, either only the user's information whose attribute has changed will be downloaded or the entire directory listing may be downloaded to each server 120-140 for use in updating the security parameter lists 170.

The downloading of the changed attribute may be initiated by the system 100 administrator, periodically, or by a selected event, such as whenever a change to an attribute is made. Thus, for example, after entering the changed attributes of various users in the directory listing 155, the system 100 administrator may enter a command to the directory server 150 instructing the directory server 150 to download the directory listing 155 or only the user information for the users having changed attributes, to the servers 120-140. Alternatively, the system 100 administrator may make the necessary changes to the directory listing 155 and have the changes downloaded to the servers 120-140 at the next scheduled update of the security parameter lists 170.

In another implementation, each server 120-140 may log onto the directory server and request information to be downloaded from the directory server 150. Such log on requests from the servers 120-140 may be for the entire directory listing 155 or may be for designated subsections of the directory listing 155. For example, if a file is to be accessed by all users having level 3 or higher security, the log on request may request only information for those users that have level 3 security or higher from the directory listing 155.

The downloaded information from the directory server 150 is used by the servers 120-140 to update the security parameter lists for the files and resources of the servers 120-140. The information downloaded from the directory server 150 may be filtered to obtain only the information used to update the security parameter lists 170. The filtering may be performed by application programs running on either the servers 120-140 or on the directory server 150.

In this way, the security parameter lists 170 on each server 120-140 may be updated without having to log onto each server individually. Rather, with the present invention, the security parameter lists 170 may be updated from a centralized directory database 150, thereby greatly reducing the burden of maintaining secured network servers.

Figure 2:
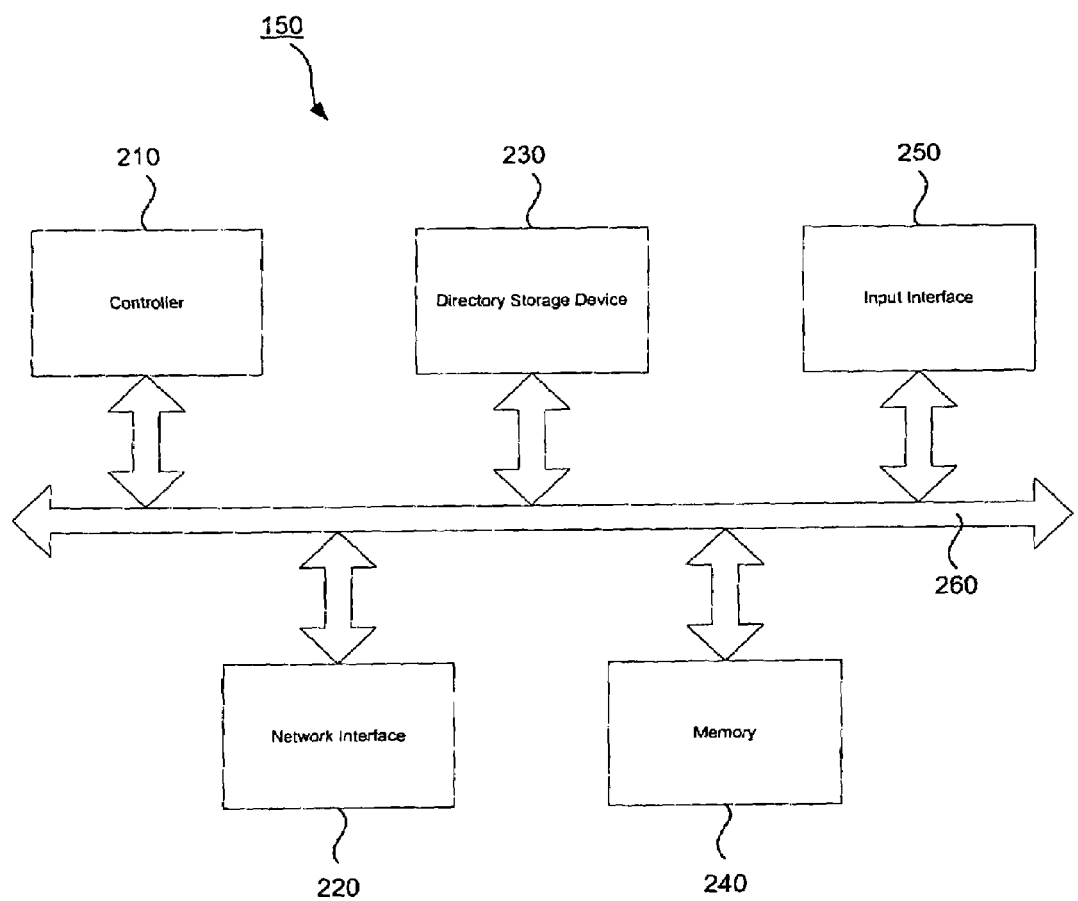
FIG. 2 is an exemplary block diagram of the directory server of FIG. 1.

FIG. 2 is an exemplary block diagram of the directory server 150. As shown in FIG. 2, the directory server 150 includes a controller 210, a network interface 220, a directory storage device 230, a memory and an input interface 250. These devices are in communication with one another via the control/signal bus 260. While FIG. 2 shows a bus architecture, other architectures, as will be readily apparent to those of ordinary skill in the art, may be used without departing from the spirit and scope of the present invention.

The controller 210 controls all the operations of the directory server 150 based on instructions stored in the memory 240. The directory storage device 230 stores the directory listing 155. The controller 210 sends and receives communications over the network 110 via the network interface 220.

The controller 210 may also receive input, such as changes to the directory listing 155, via the input interface 250. The input interface 250 may include an editor application through which a network administrator or the like, may edit the directory listing 155 stored in the directory storage device 230. The editor application may be stored, for example, in memory 240 and executed by the controller 210 when updates to the directory listing 155 are needed.

When instructed by the network administrator via the input interface 250, at scheduled periodic times, and/or when receiving a request from a server, such as servers 120-140, via the network interface 220, the controller 210 initiates a transmission of appropriate directory listing 155 data from the directory storage device 230 to the servers 120-140 via the network interface 220. The appropriate directory listing 155 data may include the entire directory listing 155, only those entries in the directory listing that have been changed, or those entries meeting criteria set by a request from the servers 120-140.

The transmission of the appropriate directory listing 155 is received by one or more of the servers 120-140 and used to update the security parameter listings of the files and resources stored on the server(s) 120-140.

Figure 3:
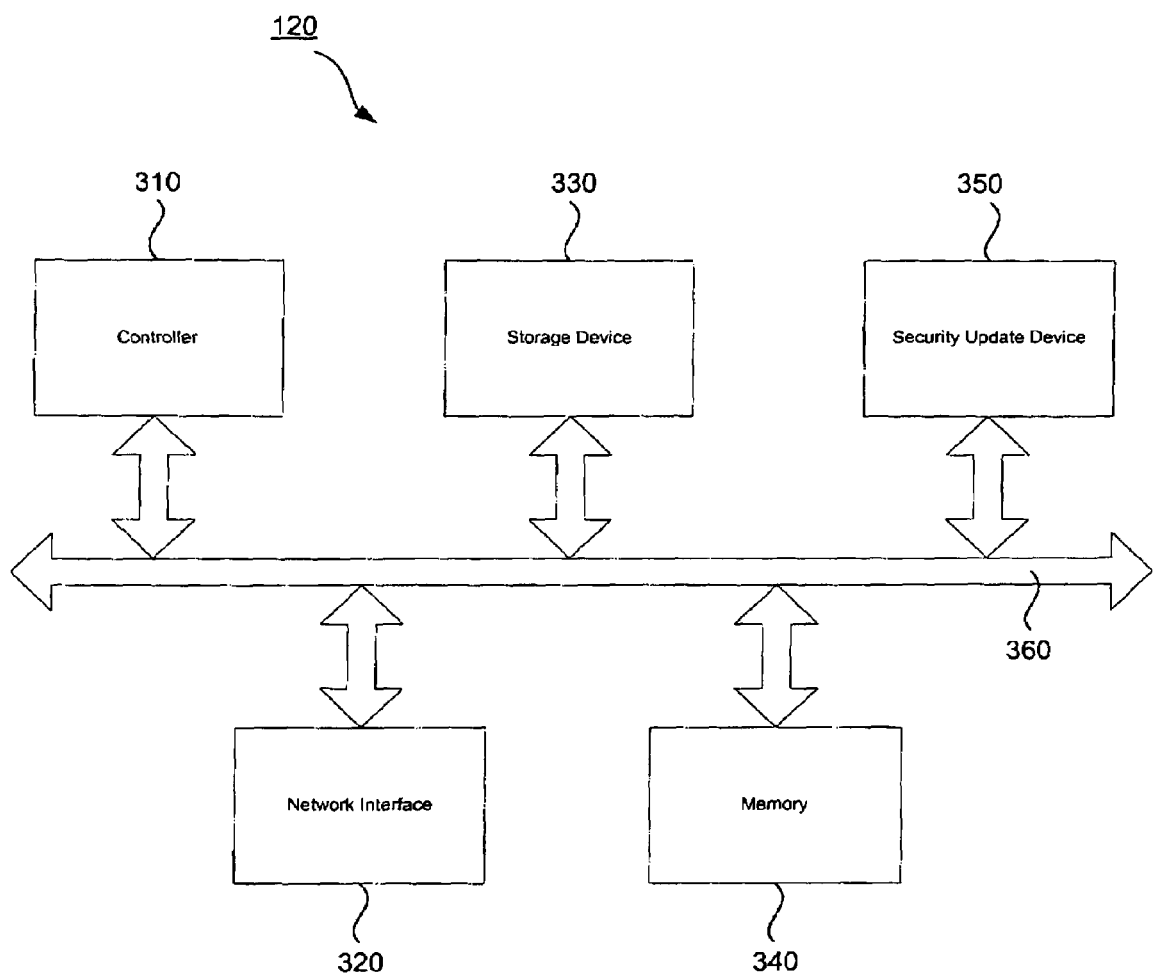
FIG. 3 is an exemplary block diagram of a server according to the present invention.

FIG. 3 is an exemplary block diagram of a server, such as server 120, for example. As shown in FIG. 3, the server 120 includes a controller 310, a network interface 320, a storage device 330, a memory 340, and a security update device 350. These devices are in communication with one another via the control/signal bus 360. Although a bus architecture is shown in FIG. 3, other architectures, as will be readily apparent to those of ordinary skill in the art, may be used without departing from the spirit and scope of the present invention.

The transmission of directory listing 155 information is received by the server 120 via the network interface 320. The controller 310, operating based on instructions stored in memory 340, directs the received information to the security update device 350. The received information may be temporarily stored in storage device 330 for use by the security update device 350.

The security update device 350 may filter the received information for the information necessary to update the security parameter lists 170. The filtering may be performed, for example, based on field identifiers or tags included in the received information. For example, each data segment may be identified by a tag that indicates the classification of the data segment is. For example, a tag may indicate that the data segment identifies a security level of an authorized user, a security group of the authorized user, an address for the authorized user, and the like. The security update device 350 may filter the received information and select the data segments that are necessary to update the security parameter lists 170. Other methods of filtering the received information for the necessary data segments may be used without departing from the spirit and scope of the present invention.

Furthermore, rather than performing the filtering of directory listing information at the server 120, the filtering may be performed prior to transmission of the information by the directory server 150. For example, the directory server 150 may select data segments from the directory listing 155 for transmission to the servers 120-140. If the information is filtered by the directory server 150, filtering may not be necessary at the servers 120-140. However, a server 120, for example, may also perform filtering functions if the necessary information for the server 120 differs from the necessary information for the other servers 130-140.

Once the received information is filtered for the necessary information, either by the directory server 150, the server 120, or both, the security update device 350 may update the security parameter lists 170 associated with the files/resources stored in the storage device 330. The security update device 350 modifies the data in the security parameter lists 170 in accordance with the received information and stores the modified security parameter list 170 in the storage device 330.

For example, assume that the received information indicates that a new user has been added to the system 100 and that the new user has an access level of 2. When the received information is used by the security update device 350 to update the security parameter lists 170, the security parameter lists 170 of files that are accessible by users with level 2 security will be updated to include the new user's identifier. In this way, the new user is added as an authorized user of the associated files.

Thus, with the present invention, security parameter lists for a multitude of files/resources on a plurality of servers may be updated and maintained from a centralized directory server. Because the update process is relatively automated and controlled from a central location, the update process is greatly simplified over the known systems.

Figure 4:
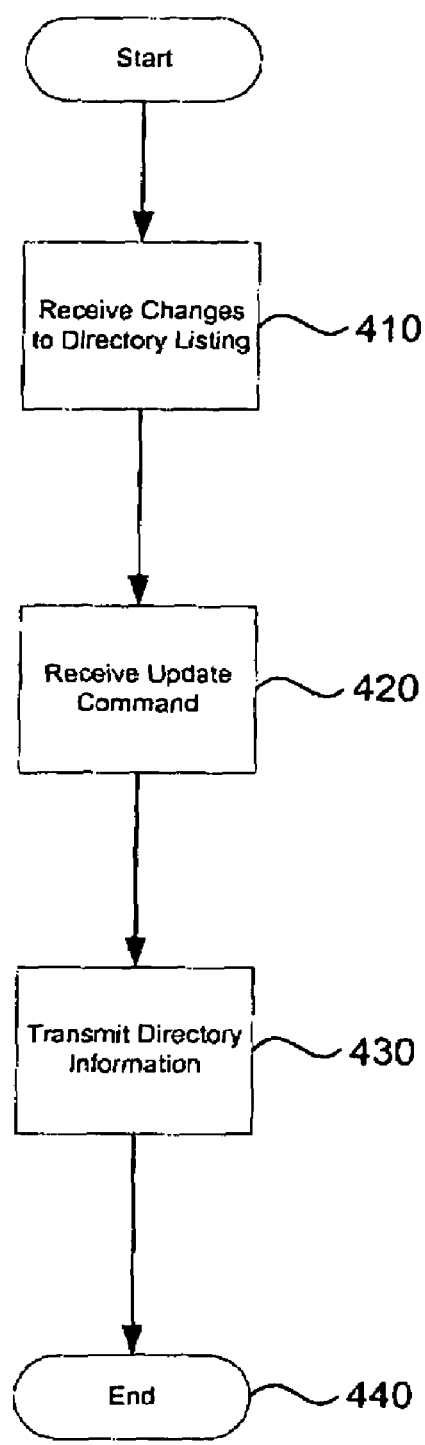
FIG. 4 is a flowchart outlining an exemplary operation of the directory server of FIG. 2.

FIG. 4 is a flowchart outlining an exemplary operation of the directory server according to the present invention. The operation shown in FIG. 4 assumes that updates to the security parameter lists 170 are performed after the directory listing 155 is updated. However, as described above, the update to the security parameter lists 170 may be performed at periodic times or when requested by the servers 120-140.

As shown in FIG. 4, the operation starts with a directory server, such as directory server 150, receiving changes to a directory listing, such as directory listing 155 in FIG. 1 (step 410). After all necessary changes have been received, the directory server receives an update command (step 420) which may be input, for example, by a network administrator or automatically input on a scheduled periodic basis.

When the directory server receives the update command, the directory server sends directory information to one or more servers, such as servers 120-140 (step 430). The directory information sent to the servers may be filtered for only the necessary security parameter list update information, may include only the changed information, may include a subsection of the directory listing, or may include the entire directory listing, based on the type of update command received. The operation of the directory server then ends (step 440).

Figure 5:
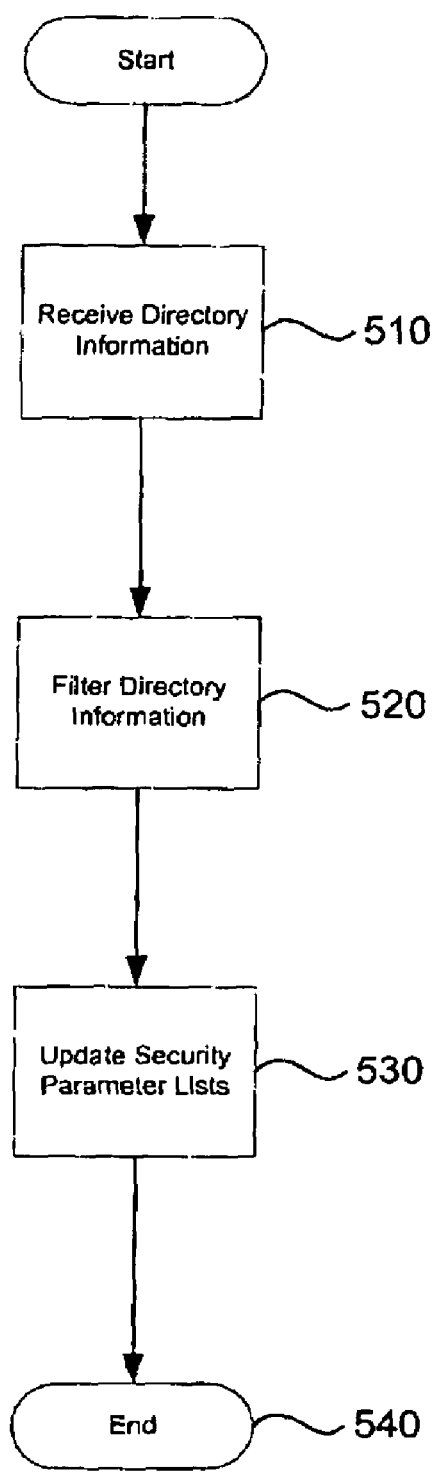
FIG. 5 is a flowchart outlining an exemplary operation of a server in accordance with the present invention.

FIG. 5 is a flowchart outlining an exemplary operation of a server, such as server 120, for example. As shown in FIG. 5, the server receives the directory information from the directory server (step 510). If the directory information has not already been filtered by the directory server or if additional filtering is necessary, the server may filter the received directory information for only the directory information that is necessary for updating the security parameter lists, such as security parameter list 170 (step 520). The resulting update information is then used to update the security parameter lists for each of the files/resources associated with the server (step 530). The operation then ends (step 540).

The present invention provides a system, apparatus and method for updating security configurations of a plurality of servers from a centralized directory server. The present invention greatly simplifies the process of updating security parameter lists associated with files/resources of servers in a network by allowing the update to be controlled from a central location. Because the update process is controlled from a central location and is relatively automatic, the speed and ease with which the updates are performed is increased, thereby increasing the overall security of the system.

While the present invention has been described with reference to a single directory server 150 facilitating the updating of security information for a plurality of servers, it should be appreciated by those of ordinary skill in the art that the network 110 may include many hundreds or thousands of servers 120-140 that must be updated. In such a system, it may be impractical to use a single directory server 150 to update all of the hundreds or thousands of servers 120-140. Thus, a plurality of directory servers, such as directory server 150, may be included in the network 110.

With such an embodiment, each directory server 150 will be responsible for updating the servers 120-140 of a particular sub-group of the network 110. the directory server 150 must therefore keep information pertaining to the network identifiers of the servers 120-140 for which it is responsible and use these network identifiers to update the servers 120-140 for which it is responsible.

In addition, the directory servers 150 themselves may be updated by a central server, such that a pyramidal hierarchy of servers is created. In this way, the central server may be updated by a network administrator, or the like, the updates may be passed down to each of the directory servers 150, which in turn may pass the updates down to the servers 120-140. Other modifications to facilitate such a pyramidal hierarchy may be made without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of updating security configurations of a plurality of servers, comprising:

changing security information in a centralized server;

receiving an update command; and downloading the changed security information to the plurality of servers in response to receiving the update command, wherein the downloaded changed security information is used to update the security configurations of the plurality of servers, wherein the security configurations of the plurality of servers are updated by updating security parameter lists associated with at least one of files and resources associated with each of the plurality of servers, and wherein the security parameter lists identify authorized users or authorized groups of users of the at least one of files and resources associated with the security parameter lists.

2. The method of claim 1, wherein the plurality of servers are Windows NT servers and the centralized server is a directory server.

3. The method of claim 1, wherein the centralized server is a directory server and wherein changing the security information includes using an editor to change a directory listing in the centralized server.

4. The method of claim 1, wherein the update command is received from a network administrator.

5. The method of claim 1, wherein the update command is received at scheduled periodic times.

6. The method of claim 1, wherein the update command is received from one or more of the plurality of servers.

7. The method of claim 1, wherein the centralized server is a light weight directory access protocol server.

8. The method of claim 1, wherein downloading the changed security information includes filtering a directory listing stored on the centralized server to extract the changed security information.

9. The method of claim 1, wherein the security configurations are updated by filtering the downloaded changed security information to extract only necessary update information for updating the security configurations and then updating the security configurations based on the extracted necessary update information.

10. A security configuration update server for updating security configurations of a plurality of servers, comprising:

a controller;

a network interface coupled to the controller, and a storage device coupled to the controller, wherein the controller, in response to receiving an update command, downloads security information stored in the storage device to the plurality of servers via the network interface, wherein the downloaded security information is used to update the security configurations of the plurality of servers, wherein the security configuration of the plurality of servers are updated by updating security parameter lists associated with at least one of files and resources associated with each of the plurality of servers, and wherein the security parameter lists identify authorized users or authorized groups of users of the at least one of files and resources associated with the security parameter lists.

11. The security configuration update server of claim 10, wherein the plurality of servers are Windows NT servers and the security configuration update server is a directory server.

12. The security configuration update server of claim 10, wherein the update command includes changes to the security information.

13. The security configuration update server of claim 10, wherein the update command is received from a network administrator.

14. The security configuration update server of claim 10, wherein the update command is received at scheduled periodic times.

15. The security configuration update server of claim 10, wherein the update command is received from one or more of the plurality of servers.

16. The security configuration update server of claim 10, wherein the security configuration update server is a light weight directory access protocol server.

17. The security configuration update server of claim 10, wherein downloading the changed security information includes filtering a directory listing stored in the storage device to extract the changed security information.

18. The security configuration update server of claim 10, wherein the security configurations are updated by filtering the downloaded security information to extract only necessary update information for updating the security configurations and then updating the security configurations based on the extracted necessary update in formation.

19. A computer program product in a computer readable medium for updating security configurations of a plurality of servers, comprising:

first instructions for changing security information in a centralized server;

second instructions for receiving an update command; and third instructions for downloading the changed security information to the plurality of servers in response to receiving the update command, wherein the downloaded changed security information is used to update the security configurations of the plurality of servers, wherein the third instructions include instructions for updating security parameter lists associated with at least one of files and resources associated with each of the plurality of servers, and wherein the security parameter lists identify authorized users or authorized groups of users of the at least one of files and resources associated with the security parameter lists.

20. The computer program product of claim 19, wherein the centralized server is a directory server and wherein the first instructions include instructions for using an editor to change a directory listing in the centralized server.

21. The computer program product of claim 19, wherein the update command is received from a network administrator.

22. The computer program product of claim 19, wherein the update command is received at scheduled periodic times.

23. The computer program product of claim 19, wherein the update command is received from one or more of the plurality of servers.

24. The computer program product of claim 19, wherein the centralized server is a light weight directory access protocol server.

25. The computer program product of claim 19, wherein the third instructions include instructions for filtering a directory listing stored on the centralized server to extract the changed security information.

\* \* \* \* \*